(12) United States Patent
Chen et al.

(10) Patent No.: US 11,385,067 B2
(45) Date of Patent: Jul. 12, 2022

(54) ROUTE PLANNING METHOD FOR MOBILE VEHICLE

(71) Applicant: ZHEJIANG YAT ELECTRICAL APPLIANCE CO., LTD, Zhejiang (CN)

(72) Inventors: Yong Chen, Zhejiang (CN); Jianfei Gong, Zhejiang (CN); Fengwu Chen, Zhejiang (CN); Zhe Zhang, Zhejiang (CN)

(73) Assignee: ZHEJIANG YAT ELECTRICAL APPLIANCE CO., LTD, Zhejiang (CN)

( * ) Notice: Subject to any disclaimer, the term of this patent is extended or adjusted under 35 U.S.C. 154(b) by 246 days.

(21) Appl. No.: 16/644,964

(22) PCT Filed: May 30, 2019

(86) PCT No.: PCT/CN2019/089203
§ 371 (c)(1),
(2) Date: Mar. 6, 2020

(87) PCT Pub. No.: WO2019/228436
PCT Pub. Date: Dec. 5, 2019

(65) Prior Publication Data
US 2020/0284596 A1 Sep. 10, 2020

(30) Foreign Application Priority Data
Jun. 1, 2018 (CN) .......................... 201810556654.0

(51) Int. Cl.
*G01C 21/34* (2006.01)
*G06F 16/22* (2019.01)
*G01C 21/36* (2006.01)

(52) U.S. Cl.
CPC ..... *G01C 21/3453* (2013.01); *G01C 21/3605* (2013.01); *G01C 21/3691* (2013.01); *G06F 16/221* (2019.01); *G06F 16/2282* (2019.01)

(58) Field of Classification Search
CPC ............... G01C 21/20; G01C 21/3453; G01C 21/3605; G01C 21/3691; G05D 1/02;
(Continued)

(56) References Cited

U.S. PATENT DOCUMENTS

2018/0246520 A1* 8/2018 Martinson ............ G05D 1/0094
2019/0314991 A1* 10/2019 Liu ...................... G05D 1/0274

FOREIGN PATENT DOCUMENTS

CN 104615138 A 5/2015
CN 105425801 A 3/2016
(Continued)

OTHER PUBLICATIONS

Translation of CN-106840168 to Chen et al. (Year: 2019).*
(Continued)

*Primary Examiner* — Kenneth J Malkowski
*Assistant Examiner* — Carville Albert Hollingsworth, IV
(74) *Attorney, Agent, or Firm* — Yue (Robert) Xu; Apex Attorneys at Law, LLP

(57) ABSTRACT

The present invention relates to the field of navigation. Disclosed is a route planning method for a mobile vehicle, comprising: partitioning an operation area of a mobile vehicle into blocks using a grid cell as a minimum unit to obtain operation blocks, and performing a reciprocating operation in each operation block in a traversing manner; after the mobile vehicle completes the operation in one operation block, moving to another operation block to perform the reciprocating operation therein in the same traversing manner. The present invention can cause a mobile vehicle to obtain a plurality of operation blocks on the basis
(Continued)

of an electronic grid map of known information by means of a block partitioning algorithm, and plan an operation route in each operation block by means of a reciprocating and traversing route planning algorithm in each operation block.

6 Claims, 2 Drawing Sheets

(58) Field of Classification Search
CPC .. G05D 1/0214; G05D 1/0221; G05D 1/0223; G05D 1/0257; G05D 1/0276; G06F 16/221; G06F 16/2282; A47L 11/24; A47L 11/00; A47L 2201/00
See application file for complete search history.

(56) References Cited

FOREIGN PATENT DOCUMENTS

| | | | |
|---|---|---|---|
| CN | 107831773 A | | 3/2018 |
| CN | 108444484 A | * | 8/2018 |
| CN | 108896048 A | | 11/2018 |
| CN | 106840168 B | * | 10/2019 |
| EP | 3226094 A1 | | 10/2017 |
| WO | 2016067640 A1 | | 5/2016 |

OTHER PUBLICATIONS

Translation of CN-108444494 to Li, Yong-Yong et al. (Year: 2018).*
International Search Report for PCT/CN2019/089203 dated Aug. 28, 2019, ISA/CN.

* cited by examiner

ROUTE PLANNING METHOD FOR MOBILE VEHICLE

The present application is a national phase of international application No. PCT/CN2019/089203 which claims priority to Chinese Patent Application No. 201810556654.0, titled "ROUTE PLANNING METHOD FOR MOBILE VEHICLE", filed on Jun. 1, 2018 with the Chinese Patent Office, which is incorporated herein by reference in its entirety.

TECHNICAL FIELD

The present disclosure relates to the technical field of navigation, and in particular to a path planning method for a mobile vehicle.

BACKGROUND

A series of mobile vehicles, including smart mowers, when encountering an obstacle during a movement, generally adjust their moving path in real time based on obstacle information detected by a sensor. However, too frequent adjustments may result in a change in an original planned path and lacking unified planning of the overall movement path of the mobile, reducing operation efficiency and quality of the mobile vehicle.

SUMMARY

In order to solve disadvantages and deficiencies in the conventional technology, a path planning method for a mobile vehicle is provided according to the present disclosure, to improve operation efficiency.

A path planning method for a mobile vehicle is provided according to the present disclosure. The path planning method includes: performing a division processing, with a grid serving as a minimum unit, on an operation area of the mobile vehicle to obtain operation blocks, and performing a reciprocating operation on each of the operation blocks in a traversal manner; and performing a cross-block operation after the mobile vehicle accomplishes operation in one operation block, and performing the reciprocating operation on another operation block in the traversal manner, where the mobile vehicle bypasses an obstacle during performing operation on each of the operation blocks.

Optionally, the performing a division processing, with a grid serving as a minimum unit, on an operation area of the mobile vehicle to obtain operation blocks includes: step 1, scanning a grid map by row or column, and in a case of scanning the grid map by column, scanning a first column of the grid map to obtain the number of continuous line segments marked as non-operated grid in the first column, marking each of the continuous line segments with marking numbers starting from 1, and performing step 2; step 2, scanning a next column of the grid map, marking each of continuous line segments in this next column with mark numbers the same as mark numbers of corresponding continuous line segments in the previous column if the number of continuous line segments marked as non-operated grid in this next column is equal to the number of continuous line segments marked as non-operated grid in the previous column, and marking each of the continuous line segments in this next column with marking numbers starting from a mark number equal to a current maximum mark number plus 1 if the number of continuous line segments marked as non-operated grid in this next column is unequal to the number of continuous line segments marked as non-operated grid in the previous column, and performing step 3; and step 3, determining whether this next column is a last column of the grid map, accomplishing the division processing if it is determined that this next column is the last column of the grid map, and performing step 2 if it is determined that this next column is not the last column of the grid map.

Optionally, the performing a reciprocating operation on each of the operation blocks in a traversal manner includes: scanning grids of the block by row or column; in a case of scanning the grids of the block by column, scanning a first column of the grids from bottom to top to generate an operation path, scanning a second column of the grids from top to bottom to generate an operation path, scanning a third column of the grids from bottom to top to generate an operation path, and so on, wherein a scanning direction is changed when scanning from one column to a next column, to generate an operation path of reciprocating traversal; in a case of scanning the grids of the block by row, scanning a first row of the grids from right to left to generate an operation path, scanning a second row of the grids from left to right to generate an operation path, scanning a third row of the grids from right to left to generate an operation path, and so on, wherein a scanning direction is changed when scanning from one row to a next row, to generate an operation path of reciprocating traversal.

Optionally, the performing a cross-block operation after the mobile vehicle accomplishes operation in one operation block includes: step 1, selecting a block with a mark number 1 as a current block; and step 2, marking the current block as an operated block, adding the mark number of the current block to an operation sequence queue, determining whether there is a non-operated block adjacent to an end grid of an operation path of the current block, selecting, if it is determined that there is a non-operated block adjacent to the end grid, the non-operated block as a next operation block, selecting, if it is determined that there is no non-operated block adjacent to the end grid, a non-operated block closest to the end grid as a next operation block, and repeating step 2 with the next operation block serving as the current block until all blocks are marked as operated blocks.

Optionally, the mobile vehicle bypassing an obstacle during performing operation on each of the operation blocks includes: step 1, acquiring, with a grid of an end of a previous block as a center, marks of an upper grid, a lower grid, a left grid and a right grid, and performing step 2 for each of the grids marked as non-operated grid or operated grid; and step 2, if the grid is a start of a next block, finding an obstacle-free path of the operation machine from the end of the previous block to the start of the next block, otherwise, acquiring, with the grid as a center, marks of an upper grid, a lower grid, a left grid and a right grid, and performing step 2 for each of the grids marked as non-operated grid or operated grid.

Optionally, the path planning method further includes an operation method for a boundary of the operation area, and the operation method for the boundary of the operation area includes: step 1, acquiring coordinate data of all grids on a turf boundary, and acquiring coordinate data of a center of a grid map;

step 2, calculating coordinates of points of a boundary-repairing operation path from the following formula:

$$x = x_0 - \frac{(x_0 - x_c) \times d}{\sqrt{(x_0 - x_c)^2 + (y_0 - y_c)^2}};$$

-continued $$y = y_0 - \frac{(y_0 - y_c) \times d}{\sqrt{(x_0 - x_c)^2 + (y_0 - y_c)^2}};$$

where $(x_0, y_0)$ represents coordinates of a boundary grip, $(x_c, y_c)$ represents coordinates of the center of the grid map, $(x, y)$ represents coordinates of the point of the path, and d represents an indentation width of the operation path, and step 3, acquiring, based on coordinates of each boundary grip, coordinates of points of the operation path corresponding to the boundary grip from the formula, and connecting adjacent points of the operation path to obtain a boundary-repairing operation path of the turf boundary.

Optionally, the path planning method further includes an operation method for controlling the mobile vehicle to operate along a spiral path when encountering an obstacle, and the operation method for controlling the mobile vehicle to operate along a spiral path when encountering an obstacle includes:

step 1, acquiring coordinate data of all grids on a boundary of the obstacle, and acquiring coordinate data of a center of the obstacle;

step 2, connecting coordinate points of adjacent grids of the boundary of the obstacle, to form an outer circle of the spiral path;

step 3, calculating coordinates of a path point of an inner circle of the spiral path from the following formula:

$$x = x_0 - \frac{(x_0 - x_c) \times d}{\sqrt{(x_0 - x_c)^2 + (y_0 - y_c)^2}};$$

$$y = y_0 - \frac{(y_0 - y_c) \times d}{\sqrt{(x_0 - x_c)^2 + (y_0 - y_c)^2}};$$

where $(x_0, y_0)$ represents coordinates of a grip of the boundary of the obstacle, $(x_c, y_c)$ represents coordinates of the center of the obstacle, $(x, y)$ represents coordinates of a path point of the inner circle, and d represents an indentation width of the operation path and has an initial value of 0, and is updated by $d=d+\Delta$ each time after calculating coordinates of the path point of the inner circle, wherein $\Delta$ is a constant representing an iterative indentation factor, and step 4, acquiring, based on coordinates of each grip of the boundary of the obstacle, coordinates of an operation path point of the inner circle corresponding to the grip of the boundary of the obstacle from the formula, connecting adjacent operation path points of the inner circle to obtain the inner circle of the spiral path, connecting the inner circle of the spiral path to the outer circle of the spiral path to obtain a boundary-repairing operation path of the boundary of the obstacle; and step 5, performing, by the operation machine, a repairing operation on the boundary of the obstacle along the spiral operation path, stopping the repairing operation if the operation machine collides with the obstacle, and accomplishing the repairing operation on the boundary of the obstacle.

Compared with the conventional technology, the present disclosure has at least the following advantages.

With the technical solutions of the embodiments of the present disclosure, after the operation in a current block is accomplished, a mowing sequence among blocks is planned by using an inter-block operation sequence planning algorithm. An obstacle-free moving path among blocks is found by using an obstacle-free path planning algorithm. A turf boundary mowing path is planned by using a boundary path planning algorithm. An obstacle boundary mowing path is planned by using a spiral path planning algorithm. A sequence of boundary mowing among obstacles is planned by using an inter-obstacle operation sequence planning algorithm. A moving path in the operation area can be accurately planned by using the above algorithms, thereby improving the operation efficiency.

BRIEF DESCRIPTION OF THE DRAWINGS

In order to more clearly illustrate technical solutions of the present disclosure, the drawings to be used in the description of the embodiments are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

In order to make structure and advantages of the present disclosure clearer, the structure of the present disclosure is further described below with reference to the drawings.

First Embodiment

Figure 1:
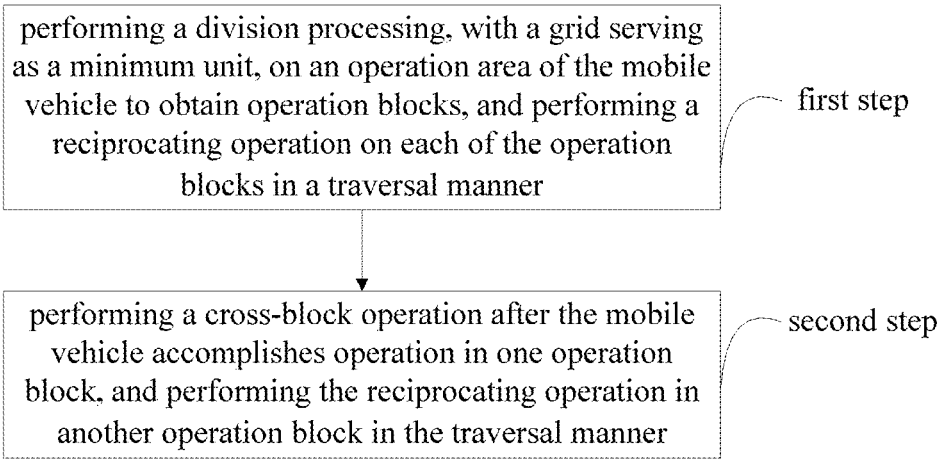
FIG. 1 is a flowchart of a path planning method for a mobile vehicle according to the present disclosure.

A path planning method for a mobile vehicle is provided according to the present disclosure. As shown in FIG. 1, the path planning method includes the following first step and second step.

In the first step, with a grid serving as a minimum unit, a division processing is performed on an operation area of the mobile vehicle to obtain operation blocks, and a reciprocating operation is performed on each of the operation blocks in a traversal manner.

In the second step, a cross-block operation is performed after the mobile vehicle accomplishes operation in one operation block, and the reciprocating operation is performed on another operation block in the traversal manner.

The mobile vehicle bypasses an obstacle during performing operation on each of the operation blocks.

With the path planning method for the mobile vehicle according to the present disclosure, the mobile vehicle can acquire, based on a known electronic grid map, multiple operation blocks by using a block segmentation algorithm, and plans an operation path in each of the blocks by using a reciprocating traversal path planning algorithm. After the operation in a current block is accomplished, a mowing sequence among blocks is planned by using an inter-block operation sequence planning algorithm. An obstacle-free moving path among blocks is found by using an obstacle-free path planning algorithm. A turf boundary mowing path is planned by using a boundary path planning algorithm. An obstacle boundary mowing path is planned by using a spiral path planning algorithm. A sequence of boundary mowing among obstacles is planned by using an inter-obstacle operation sequence planning algorithm.

Each of the planning algorithms is described below.

In order to facilitate understanding, an implementation in which a lawn mower serves as the mobile vehicle is described below.

An electronic grid map of a mowing area is two-dimensional grid data for describing lawn environment for the mowing robot. Each grid corresponds to a mark, and the mark includes an inaccessible mark, an unknown turf mark and a mown turf mark. A grid marked as inaccessible means that the grid is an obstacle or an outside of the turf that cannot be entered.

An implementation of performing a division processing, with a grid serving as a minimum unit, on an operation area of the mobile vehicle to obtain operation blocks in the first step belongs to the block segmentation algorithm. The block segmentation algorithm includes the following steps 1 to 3.

In step 1, a grid map is scanned by row or column. Taking an example of scanning the grid map by column, a first column of the grid map is scanned to obtain the number of continuous line segment marked as non-operated grid in the first column. Each of the continuous line segments is marked with mark numbers starting from 1. Then step 2 is performed.

In step 2, a next column of the grid map is scanned. If the number of continuous line segments marked as non-operated grid in this next column is equal to that in the previous column, the continuous line segments in this next column are marked with mark numbers the same as those of corresponding continuous line segments in the previous column. If the number of continuous line segments marked as non-operated grid in this next column is unequal to that in the previous column, each of the continuous line segments in this next column is marked with mark numbers starting from a mark number equal to a current maximum mark number plus 1. Then step 3 is performed.

In step 3, it is determined whether this next column is the last column of the grid map. If it is determined that this next column is the last column of the grid map, the division processing is accomplished. If it is determined that this next column is not the last column of the grid map, step 2 is performed.

With the mowing block segmentation algorithm, a turf area in the grid map can be divided into multiple blocks with different mark numbers. A mowing path in each of the blocks is planned by using the reciprocating traversal path planning algorithm in each of the blocks.

An implementation of performing the reciprocating operation on each of the operation blocks in a traversal manner in the first step belongs to the reciprocating traversal path planning algorithm. The reciprocating traversal path planning algorithm includes steps of:

scanning grids of the block by row or column;

taking an example of scanning the grids by column, scanning a first column of the grids from bottom to top to generate an operation path, scanning a second column of the grids from top to bottom to generate an operation path, scanning a third column of the grids from bottom to top to generate an operation path, and so on, where a scanning direction is changed when scanning from one column to a next column, to generate an operation path of reciprocating traversal;

taking an example of scanning the grids by row, scanning a first row of the grids from right to left to generate an operation path, scanning a second row of the grids from left to right to generate an operation path, scanning a third row of the grids from right to left to generate an operation path, and so on, where a scanning direction is changed when scanning from one row to a next row, to generate an operation path of reciprocating traversal.

An implementation of performing the cross-block operation after the mobile vehicle accomplishes operation in one operation block in the second step belongs to the inter-block operation sequence planning algorithm. The inter-block operation sequence planning algorithm includes the following steps 1 to 2.

In step 1, a block with a mark number 1 is selected as a current block.

In step 2, the current block is marked as an operated block, and the mark number is added to an operation sequence queue, whether there is a non-operated block adjacent to an end grid of an operation path of the current block is determined. If it is determined that there is a non-operated block adjacent to the end grid, the non-operated block is selected as a next operation block. If it is determined that there is no non-operated block adjacent to the end grid, a non-operated block closest to the end grid is selected as a next operation block, and step 2 is repeated with the next operation block serving as the current block until all blocks are marked as operated blocks.

With the inter-block operation sequence planning algorithm, an order in which the lawn mower sequentially operates among the blocks can be obtained. An obstacle-free path of the lawn mower from an end of a previous block to a start of a next block is found by using an obstacle-free path planning algorithm. The obstacle-free path planning algorithm is embodied as an implementation of bypassing an obstacle when performing operation in each of the operation blocks. The obstacle-free path planning algorithm includes the following steps 1 to 2.

In step 1, with a grid serving as an end of the previous block as a center, mark numbers of an upper grid, a lower grid, a left grid, and a right grid are acquired, and step 2 is performed for each of a non-operated grid or an operated grid.

In step 2, if the grid is the start of the next block, an obstacle-free path of the operation machine from the end of the previous block to the start of the next block is found. Otherwise, with the grid as a center, marks of an upper grid, a lower grid, a left grid and a right grid are acquired, and step 2 is performed for each of the grids marked as non-operated grid or operated grid.

With the above algorithms, most parts of the lawn in the mowing area can be mown. Due to characteristics of the grid map, there may be both a turf and an obstacle in one grid, resulting in partially unknown areas on a turf boundary and an obstacle boundary. In order to further improve coverage of mowing, a boundary path planning algorithm to plan a mowing path for the turf boundary and a spiral path planning algorithm to plan a mowing path for the obstacle boundary are provided according to the present disclosure.

Further, the boundary path planning algorithm includes the following steps 1 to 3.

In step 1, coordinate data of all grids on a turf boundary is acquired, and coordinate data of a center of the grid map is acquired.

In step 2, coordinates of boundary-repairing operation path points are calculated from the following formula:

$$x = x_0 - \frac{(x_0 - x_c) \times d}{\sqrt{(x_0 - x_c)^2 + (y_0 - y_c)^2}};$$

-continued $$y = y_0 - \frac{(y_0 - y_c) \times d}{\sqrt{(x_0 - x_c)^2 + (y_0 - y_c)^2}};$$

where $(x_0, y_0)$ represents coordinates of a boundary grip, $(x_c, y_c)$ represents coordinates of the center of the grid map, $(x, y)$ represents coordinates of a path point, and d represents an indentation width of the operation path.

In step 3, based on coordinates of each boundary grip, coordinates of an operation path point corresponding to the boundary grip are acquired from the formula, and adjacent operation path points are connected to obtain a boundary-repairing operation path of the turf boundary.

The spiral path planning algorithm includes the following steps 1 to 5.

In step 1, coordinate data of all grids on an obstacle boundary is acquired, and coordinate data of a center of the obstacle is acquired.

In step 2, coordinate points of adjacent grids of the obstacle boundary are connected, to form an outer circle of a spiral path.

In step 3, coordinates of a path point of an inner circle of the spiral path is calculated from the following formula:

$$x = x_0 - \frac{(x_0 - x_c) \times d}{\sqrt{(x_0 - x_c)^2 + (y_0 - y_c)^2}};$$

$$y = y_0 - \frac{(y_0 - y_c) \times d}{\sqrt{(x_0 - x_c)^2 + (y_0 - y_c)^2}};$$

where $(x_0, y_0)$ represents coordinates of a boundary grip of the obstacle, $(x_c, y_c)$ represents coordinates of the center of the obstacle, $(x, y)$ represents coordinates of a path point of the inner circle, and d represents an indentation width of the operation path and has an initial value of 0, and is updated by d=d+Δ each time after calculating coordinates of the path point of the inner circle, where Δ is a constant representing an iterative indentation factor.

In step 4, based on coordinates of each boundary grip of the obstacle, coordinates of an operation path point of the inner circle corresponding to the boundary grip of the obstacle are acquired from the formula. Adjacent operation path points of the inner circle are connected to obtain an inner circle of the spiral path. The inner circle is connected to the outer circle to obtain a boundary-repairing operation path of the obstacle boundary.

In step 5, the operation machine performs the repairing operation on the obstacle boundary along the spiral operation path. If the operation machine collides with the obstacle, the repairing operation is stopped, and the repairing operation on the obstacle boundary is accomplished.

The inter-obstacle operation sequence planning algorithm includes the following steps 1 to 2.

In step 1, an obstacle closest to the lawn mower is selected as a start of the operation sequence. The obstacle serves as a current obstacle, and is marked as mown.

In step 2, if all obstacles are marked as mown, operation sequence planning is accomplished. Otherwise, an obstacle closest to the current obstacle is selected as a next operation target. The obstacle closest to the current obstacle serves as the current obstacle, and is marked as mown, and step 2 is repeated.

Compared with the conventional technology, the present disclosure has the following significant advantages.

(1) the operation blocks can be divided based on an obstacle, which effectively reduces a distance of the lawn mower bypassing the obstacle and improves mowing efficiency.

(2) the operation path can be planned globally, and the mowing path can completely cover the operation area without a dead corner and an unknown area, thereby ensuring mowing quality.

Figure 2:
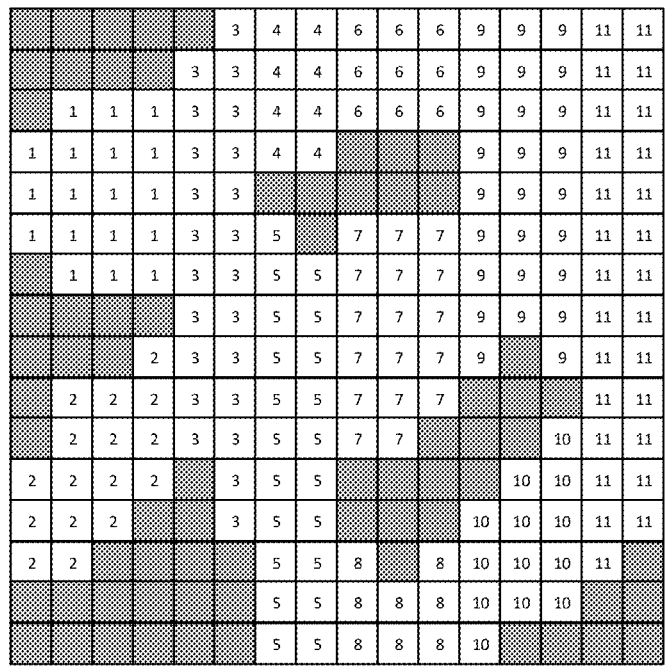
FIG. 2 is a schematic diagram showing a mowing block dividing algorithm according to the present disclosure.

Based on the above, a specific path planning result is shown in FIG. 2. The grid map consists of inaccessible grids and unknown turf grids. First, the unknown turf grids are divided into blocks. Started from the first column, the unknown turf grids in the first column are divided into two continuous line segments by the inaccessible grids. The upper line segment is marked as 1 and the lower line segment is marked as 2. The second column is also divided into two continuous line segments, the upper line segment is marked as 1 and the lower line segment is marked as 2. The third column and the fourth are divided in a similar manner with the upper line segment being marked as 1 and the lower line segment being marked as 2. The number of continuous line segment of the unknown turf grid in the fifth column is 1, which is different from the number of continuous line segments in the previous column, and the mark number for the fifth column is required to be updated. The continuous line segment in the fifth column is marked as 3. The number of unknown turf grids in the sixth column form one continuous line segment, which is equal to the number of continuous line segment in the previous column, thus the line segment in the sixth column is marked as 3. Similarly, the grid map is divided into 11 blocks.

Figure 3:
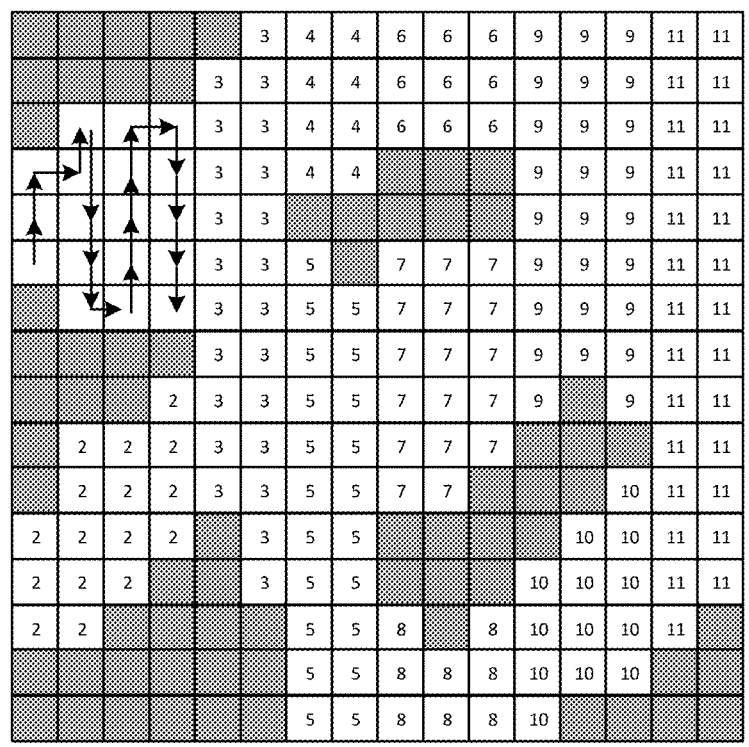
FIG. 3 is a schematic diagram of a reciprocating traversal path planning algorithm according to the present disclosure.

As shown in FIG. 3, the block 1 is scanned by column. The first column of the grids is scanned from bottom to top, to generate a mowing path. The second column of the grids is scanned from top to bottom, to generate a mowing path. The third column of the grids is scanned from bottom to top, to generate a mowing path, and so on. A scanning direction is changed when scanning from one column to a next column, to generate a mowing path of reciprocating traversal. Similarly, a mowing path in each block may be planned by using the reciprocating traversal path planning algorithm.

The block 1 serves as a start of the block operation sequence. Based on the operation sequence planning algorithm, block 3 is selected as a next operation block since an end of the mowing path in the block 1 is adjacent to block 3. Similarly, an operation sequence of all blocks may be determined.

An obstacle-free path from the end of the block 1 to the start of the block 3 is required to be planned for the lawn mower. A shortest path to the start of the block 3 can be found by using the obstacle-free path planning algorithm. Similarly, all obstacle-free paths among sequential operation blocks can be determined.

The mowing path in each block is combined with the obstacle-free moving path among blocks, to obtain a complete mowing path in the mowing area.

With the boundary path planning algorithm, the mowing path of the turf boundary can be obtained. With the spiral path planning algorithm, the mowing path of the obstacle boundary for each obstacle can be planned. With the inter-obstacle operation sequence planning algorithm, a mowing sequence for mowing obstacle boundaries can be obtained.

In this sequence, mowing paths of all obstacle boundaries are connected, to obtain a complete obstacle boundary mowing path.

A path planning method for a mobile vehicle is provided according to the present disclosure. The method includes: performing a division processing, with a grid serving as a minimum unit, on an operation area of the mobile vehicle to obtain operation blocks, and performing a reciprocating operation on each of the operation blocks in a traversal manner; and performing a cross-block operation after the mobile vehicle accomplishes operation in one operation block, and performing the reciprocating operation in another operation block in the traversal manner. With this method, the mobile vehicle can acquire, based on the known electronic grid map, multiple operation blocks by using the block segmentation algorithm, and plans the operation path in each of the blocks by using a reciprocating traversal path planning algorithm. After the operation in the current block is accomplished, the mowing sequence among blocks can be planned by using the inter-block operation sequence planning algorithm. The obstacle-free moving path among blocks can be found by using the obstacle-free path planning algorithm. The turf boundary mowing path can be planned by using a boundary path planning algorithm. The obstacle boundary mowing path can be planned by using the spiral path planning algorithm. The sequence of boundary mowing among obstacles can be planned by using an inter-obstacle operation sequence planning algorithm. The moving path in the operation area can be accurately planned by using the above algorithms, thereby finally improving the operation efficiency.

Serial numbers in the above embodiment is only for description, and does not represent a sequence for assembling or using components.

Only the embodiments of the present disclosure are described above, and the present disclosure is not limited thereto. Any modification, equivalent replacement, or improvement made within the spirit and principle of the present disclosure should be included in the protection scope of the present disclosure.

The invention claimed is:

1. A method for cleaning an area, performed by a mobile vehicle, comprising:
performing a division processing on the area to obtain a plurality of operation blocks, wherein each operation block including one or more grids, with the grid serving as a minimum unit,
performing cleaning on one of the operation blocks in a reciprocating and traversal manner; and
performing an operation for crossing from one operation block to another operation blocky after the mobile vehicle accomplishes cleaning of the one operation block, and performing cleaning on the another operation block in the reciprocating and traversal manner, until each of the operation block is cleaned,
wherein the mobile vehicle bypasses an obstacle during performing cleaning on each of the operation blocks, the method further comprising:
performing following steps on a boundary of the area:
step 1, acquiring coordinate data of all grids on the boundary, and acquiring coordinate data of a center of a grip map;
step 2, calculating coordinates of points of a boundary-repairing operation path from the following formula:

$$x = x_0 - \frac{(x_0 - x_c) \times d}{\sqrt{(x_0 - x_c)^2 + (y_0 - y_c)^2}};$$

$$y = y_0 - \frac{(y_0 - y_c) \times d}{\sqrt{(x_0 - x_c)^2 + (y_0 - y_c)^2}};$$

wherein $(x_0, y_0)$ represents coordinates of a grid on the boundary, $(x_c, y_c)$ represents coordinates of the center of the grip map, $(x, y)$ represents coordinates of the point of the operation path, and d represents an indentation width of the operation path,
step 3, acquiring, based on coordinates of each grid on the boundary, coordinates of points of the operation path corresponding to the grid on the boundary from the formula, and connecting adjacent points of the operation path to obtain the boundary-repairing operation path of the boundary, and
step 4, performing cleaning on the boundary according to the boundary-repairing operation path of the boundary.

2. The path planning method for the mobile vehicle according to claim 1, wherein the performing a division processing comprises:
step 1, scanning a grid map by row or column, and in a case of scanning the grid map by column, scanning a first column of the grid map to obtain the number of continuous line segments marked as non-operated grid in the first column, marking each of the continuous line segments with marking numbers starting from 1, and performing step 2;
step 2, scanning a next column of the grid map, marking each of continuous line segments in this next column with mark numbers the same as mark numbers of corresponding continuous line segments in the previous column if the number of continuous line segments marked as non-operated grid in this next column is equal to the number of continuous line segments marked as non-operated grid in the previous column, and marking each of the continuous line segments in this next column with marking numbers starting from a mark number equal to a current maximum mark number plus 1 if the number of continuous line segments marked as non-operated grid in this next column is unequal to the number of continuous line segments marked as non-operated grid in the previous column, and performing step 3; and
step 3, determining whether this next column is a last column of the grid map, accomplishing the division processing if it is determined that this next column is the last column of the grid map, and performing step 2 if it is determined that this next column is not the last column of the grid map.

3. The path planning method for the mobile vehicle according to claim 1, wherein the performing cleaning on one of the operation blocks in a reciprocating and traversal manner comprises:
scanning grids of the one of the operation blocks by row or column;
in a case of scanning the grids by column, scanning a first column of the grids from bottom to top to generate an operation path, scanning a second column of the grids from top to bottom to generate an operation path, scanning a third column of the grids from bottom to top to generate an operation path, and so on, wherein a scanning direction is changed when scanning from one column to a next column, to generate an operation path of reciprocating traversal;

in a case of scanning the grids by row, scanning a first row of the grids from right to left to generate an operation path, scanning a second row of the grids from left to right to generate an operation path, scanning a third row of the grids from right to left to generate an operation path, and so on, wherein a scanning direction is changed when scanning from one row to a next row, to generate an operation path of reciprocating traversal.

4. The path planning method for the mobile vehicle according to claim 1, wherein the performing an operation for crossing from one operation block to another operation block comprises:

step 1, selecting a block with a mark number 1 as a current block; and step 2, marking the current block as an operated block, adding the mark number of the current block to an operation sequence queue, determining whether there is a non-operated block adjacent to an end grid of an operation path of the current block, selecting, if it is determined that there is a non-operated block adjacent to the end grid, the non-operated block as a next operation block, selecting, if it is determined that there is no non-operated block adjacent to the end grid, a non-operated block closest to the end grid as a next operation block, and repeating step 2 with the next operation block serving as the current block until all blocks are marked as operated blocks.

5. The path planning method for the mobile vehicle according to claim 1, wherein the mobile vehicle bypassing an obstacle during performing cleaning on each of the operation blocks comprises:

step 1, acquiring, with a grid of an end of a previous block as a center, marks of an upper grid, a lower grid, a left grid and a right grid, and performing step 2 for each of the grids marked as non-operated grid or operated grid; and step 2, if the grid is a start of a next block, finding an obstacle-free path of the operation machine from the end of the previous block to the start of the next block, otherwise, acquiring, with the grid as a center, marks of an upper grid, a lower grid, a left grid and a right grid, and performing step 2 for each of the grids marked as non-operated grid or operated grid.

6. The path planning method for the mobile vehicle according to claim 1, further comprising an operation method for controlling the mobile vehicle to operate along a spiral path when encountering an obstacle, and the operation method for controlling the mobile vehicle to operate along a spiral path when encountering an obstacle comprises:

step 1, acquiring coordinate data of all grids on a boundary of the obstacle, and acquiring coordinate data of a center of the obstacle;

step 2, connecting coordinate points of adjacent grids of the boundary of the obstacle, to form an outer circle of the spiral path;

step 3, calculating coordinates of a path point of an inner circle of the spiral path from the following formula:

$$x = x_0 - \frac{(x_0 - x_c) \times d}{\sqrt{(x_0 - x_c)^2 + (y_0 - y_c)^2}};$$

$$y = y_0 - \frac{(y_0 - y_c) \times d}{\sqrt{(x_0 - x_c)^2 + (y_0 - y_c)^2}};$$

wherein $(x_0, y_0)$ represents coordinates of a grid of the boundary of the obstacle, $(x_c, y_c)$ represents coordinates of the center of the obstacle, $(x, y)$ represents coordinates of a path point of the inner circle, and d represents an indentation width of the operation path and has an initial value of 0, and is updated by $d=d+\Delta$ each time after calculating coordinates of the path point of the inner circle, wherein $\Delta$ is a constant representing an iterative indentation factor, and step 4, acquiring, based on coordinates of each grid of the boundary of the obstacle, coordinates of an operation path point of the inner circle corresponding to the grid of the boundary of the obstacle from the formula, connecting adjacent operation path points of the inner circle to obtain the inner circle of the spiral path, connecting the inner circle of the spiral path to the outer circle of the spiral path to obtain a boundary-repairing operation path of the boundary of the obstacle; and step 5, performing, by the operation machine, a repairing operation on the boundary of the obstacle along the spiral operation path, stopping the repairing operation if the operation machine collides with the obstacle, and accomplishing the repairing operation on the boundary of the obstacle.

* * * * *